(12) United States Patent
Slates (10) Patent No.: US 6,803,757 B2
(45) Date of Patent: Oct. 12, 2004

(54) MULTI-COIL EDDY CURRENT PROXIMITY PROBE SYSTEM

(75) Inventor: Richard Dale Slates, Minden, NV (US)

(73) Assignee: Bentley Nevada, LLC, Minden, NV (US)

( * ) Notice: Subject to any disclaimer, the term of this patent is extended or adjusted under 35 U.S.C. 154(b) by 0 days.

(21) Appl. No.: 09/970,208

(22) Filed: Oct. 2, 2001

(65) Prior Publication Data

US 2003/0062891 A1 Apr. 3, 2003

(51) Int. Cl.$^7$ .............................. G01B 7/14; G01B 7/30
(52) U.S. Cl. ........................... 324/207.17; 324/207.12; 324/207.26; 324/239
(58) Field of Search .................... 324/225, 229–231, 324/239–243, 207.12, 207.17–207.19, 207.26, 329, 207.25; 307/116, 117; 340/941; 73/660, 661

(56) References Cited

U.S. PATENT DOCUMENTS

| | | | |
|---|---|---|---|
| 3,378,763 A | | 4/1968 | Hastings |
| 3,473,110 A | | 10/1969 | Hardin et al. |
| 3,521,158 A | | 7/1970 | Morrow et al. |
| 3,634,799 A | | 1/1972 | Strauch |
| 3,750,010 A | | 7/1973 | Abnett et al. |
| 3,996,510 A | | 12/1976 | Guichard |
| 4,054,881 A | * | 10/1977 | Raab |
| 4,191,922 A | | 3/1980 | Harris et al. |
| 4,207,520 A | | 6/1980 | Flora et al. |
| 4,303,885 A | | 12/1981 | Davis et al. |
| 4,405,896 A | | 9/1983 | Akita |
| 4,467,281 A | | 8/1984 | Davis et al. |
| 4,514,689 A | | 4/1985 | Gerard |
| 4,528,506 A | * | 7/1985 | Davis et al. ............ 324/240 X |
| 4,553,094 A | | 11/1985 | Gehrke |
| 4,563,645 A | | 1/1986 | Kerr |
| 4,564,810 A | | 1/1986 | Geithman et al. |
| 4,567,434 A | | 1/1986 | Yamada et al. |
| 4,613,815 A | * | 9/1986 | Christel, Jr. ............ 324/243 X |
| 4,647,854 A | | 3/1987 | Yamada et al. |
| 4,652,822 A | | 3/1987 | Wallace |
| 4,659,989 A | | 4/1987 | Kerr |
| 4,716,366 A | | 12/1987 | Hosoe et al. |
| 4,737,698 A | * | 4/1988 | McMullin et al. .......... 318/653 |
| 4,783,626 A | | 11/1988 | Shimizu |
| 4,868,499 A | | 9/1989 | Walker |
| 4,875,007 A | | 10/1989 | Ginns |
| 4,945,446 A | | 7/1990 | Kuroda et al. |
| 5,065,093 A | | 11/1991 | Nauta et al. |
| 5,103,173 A | | 4/1992 | Honkura et al. |
| 5,247,281 A | * | 9/1993 | Facon et al. |
| 5,264,733 A | | 11/1993 | Tigges |
| 5,420,507 A | | 5/1995 | Laskowski |
| 5,432,444 A | | 7/1995 | Yasohama et al. |

(List continued on next page.)

Primary Examiner—N. Le
Assistant Examiner—Darrell Kinder
(74) Attorney, Agent, or Firm—Dennis A. DeBoo (57) ABSTRACT

A proximity probe system comprising a multi-coil proximity probe including a drive coil, a sense coil and a reference coil. The system includes a signal generator driving the drive coil with an alternating current for creating a magnetic field that induces eddy currents in a proximate conductive object resulting in an eddy current induced magnetic field emanating therefrom. The sense coil is interposed between the object and the drive coil for outputting an object induced alternating current that is detected by the system and correlated to a position of the object relative to the probe. The reference coil is positioned to be inductively coupled to the drive coil for carrying a drive coil induced alternating current that is detected, conditioned and feedback to the signal generator for controlling the magnetic field radiating from the drive coil while sensing the the object induced alternating current in the sense coil.

7 Claims, 6 Drawing Sheets

U.S. PATENT DOCUMENTS

| | | |
|---|---|---|
| 5,477,735 A | 12/1995 | Li |
| 5,489,844 A | 2/1996 | Preston et al. |
| 5,525,900 A | 6/1996 | Larsen et al. |
| 5,541,510 A | 7/1996 | Danielson |
| 5,568,048 A | 10/1996 | Schroeder et al. |
| 5,592,078 A | 1/1997 | Giragosian et al. |
| 5,623,427 A * | 4/1997 | Vandervalk et al. .... 324/229 X |
| 5,792,956 A | 8/1998 | Li |
| 5,854,553 A | 12/1998 | Barclay et al. |

* cited by examiner

MULTI-COIL EDDY CURRENT PROXIMITY PROBE SYSTEM

FIELD OF THE INVENTION

The instant invention relates generally to eddy current proximity probe systems for determining displacement motion and position of an observed conductive target object and in particular, to a multi-coil eddy current proximity probe system utilized for monitoring, for example, rotating and reciprocating machinery.

BACKGROUND OF THE INVENTION

Proximity probe systems that analyze and monitor, for example, rotating and reciprocating machinery are known in the art. These systems typically include one or more proximity probes: noncontacting eddy current displacement devices operating on the eddy current principle for measuring displacement motion and position of an observed conductive target object relative to one or more of the displacement devices. Typically, each proximity probe is located proximate a target object such as a rotating shaft of a machine or an outer race of a rolling element bearing being monitored and is connected to signal conditioning circuitry which in turn is coupled to analyzing apparatus for data reduction and display. By known techniques, these systems analyze and monitor rotating and reciprocating machinery for providing, inter alia, indications of incipient problems. A variety of proximity probes and systems are at the present time being sold by the assignee of this application, Bently Nevada Corporation of Minden, Nev.

Generally, a proximity probe system includes a proximity probe comprised of a multi-conductor probe cable coupled to an inductor or coil that is situated at a forward most end of the probe. The coil is coupled to the signal conditioning circuitry of the system via the probe cable and is driven by a radio frequency signal from the signal conditioning circuitry and in turn creates an alternating magnetic field in any proximate conductive target object. This magnetic field produces eddy currents in the object that induce a counter electromotive force (emf) in the coil that alters the impedance of the probe and thus the output of the probe as a function of distance between the probe and observed target object. The signal conditioning circuitry demodulates the probe output and provides output signals proportional to a distance or gap interposed between the proximity probe and the observed conductive target object. Thus, the signal conditioning circuitry is also sometimes referred to as an oscillator-demodulator device.

The above-delineated system is burdened by temperature errors due to temperature variations in the multi-conductor cables, the coil and the electronics associated with the signal conditioning circuitry. Additionally, temperature variations in the targets themselves cause temperature stability problems within the system. Furthermore, component and manufacturing variations also generally burden the system.

Moreover, and more particularly, sense coil resistance of the probe is one principle source of temperature drift error. Thus, the process of measuring gap as a function of the impedance of the coil is susceptible to this error thereby resulting in inaccurate proximity probe measurements as a consequence of the drift error causing a false appearance of a gap change between the target and probe. Such inconsistencies in temperature stability of the proximity probe result in unpredictable and unreliable measurements even when the proximity probe is functioning in its linear range of operation.

U.S. Pat. No. 5,854,553 to Barclay, et al. teaches the use of a digitally linearizing eddy current probe wherein the output of an eddy current probe is demodulated and subsequently linearized using an analog to digital converter, a digital signal processor, and a memory. The linearized digital output signal is converted back to an analog signal, the voltage of which is used as being directly proportional to the position of the conductive target in relation to the probe. Hence, the U.S. Pat. No. 5,854,553 to Barclay, et al. measures the gap, as a function of the impedance of the coil being driven to engender or set up eddy currents in the target object. Thus, U.S. Pat. No. 5,854,553 to Barclay, et al. also suffers from, inter alia, the same temperature instability problems delineated hereinabove.

Moreover, known multiple coil proximity switch devices, distance measurement devices, and metal detecting circuits are also plagued by, inter alia, temperature drift error and component and manufacturing variations.

For the foregoing reasons, it would be highly desirable to provide an eddy current proximity probe system that would be accurate, reliable, and substantially unaffected by temperature, component and manufacturing variations. More specifically, it would be highly desirable to provide a proximity probe system that compensates for different probe cable lengths, resistance changes in the cable and the probe coil, and temperature changes in the probe cable, coil, and signal conditioning devices.

SUMMARY OF THE INVENTION

The instant invention is distinguished over the known prior art in a multiplicity of ways. For one thing, the instant invention provides a multi-coil eddy current proximity probe system that provides accurate and reliable measurements over a wide range of circuit and environmental conditions. Particularly, the instant invention provides an eddy current proximity probe system that includes a unique multi-coil proximity probe and processing and control circuitry that generally eliminates temperature errors and manufacturing and component variations. For example, the unique multi-coil probe, and processing and control circuitry provides a stable output with different probe cable lengths, with resistance changes in the cables and probe coils, and with temperature changes in the probe cables, coils, and circuitry thereby providing accurate and reliable measurements of machine operating characteristics. Furthermore, the eddy current proximity probe system generally solves the problem of compensating for changes in the conductivity, permeability, and temperature profiles of different target materials. Moreover, and in stark contrast to the known prior art, the instant invention detects a current in a sense coil separate from a coil driven to engender or set up eddy currents in a target object for determining gap values.

In one form of the instant invention, the eddy current proximity system includes a multi-coil proximity probe including a sense coil, a drive coil, and a reference coil. The coils are located adjacent one another with their interiors or hollow cores coaxially arranged along a common longitudinal axis. The drive coil is interposed between the sense coil and the reference coil such that the sense coil is positioned at a forwardmost end of the probe. The system is further comprised of a signal conditioning and control system having a feed back loop comprised of a first phase detector or first multiplier circuit and a signal generator having an automatic gain controller. The first multiplier includes an input coupled to the reference coil via a multi- conductor cable and an output electrically connected to the automatic gain controller. An output of the automatic gain controller is coupled to the signal generator that is coupled to the drive coil via a multi-conductor cable. The signal generator drives the drive coil with an alternating drive signal that generates a first magnetic field that radiates from the drive coil and induces an alternating reference signal in the reference coil. Any phase discrepancy in the reference signal results in a control signal being sent from the multiplier to automatic gain controller which provides a corrective control signal which automatically adjusts the gain of the signal generator for controlling the amplitude of the drive signal. Thus, the input signal driving the drive coil is a function of its own magnetic field output. Additionally, any attenuation by the cable coupling the reference coil to the first multiplier is corrected for by the closed feedback loop between the drive coil and the reference coil. Furthermore, temperature variations, manufacturing variations and component variations are inside the closed feedback loop and are thus compensated.

The first magnetic field radiating from the drive coil also induces eddy currents in any proximate conductive target object. Thus, when the forwardmost end of probe is positioned adjacent a conductive target object the eddy currents induced therein in turn emanate a second magnetic field. The sense coil that is interposed between the drive coil and the conductive target object senses this second magnetic field. As a result, an alternating sense signal is induced in the sense coil that has a signature that is a function of the distance or gap between the probe and the conductive target object. A multi-conductor cable, preferably of the same length as the cable coupling the reference coil to the first phase detector, transmits the sense signal to a processor/analyzer system where it is conditioned into signals proportional to the distance or gap between the probe and the conductive target object.

It is important to note that the second magnetic field created by the first magnetic field is substantially a function of spacing as a result of the instant invention holding the first magnetic field substantially constant while the signal driving the drive coil may be fluctuating as a result of temperature, component and manufacturing variations.

OBJECTS OF THE INVENTION

Accordingly, a primary object of the instant invention is to provide a new, novel and useful multi-coil eddy current proximity probe system: apparatus and method.

A further object of the instant invention is to provide a system as characterized above that includes a multi-coil eddy current proximity probe and a signal conditioning and control system.

Another further object of the instant invention as characterized above is to provide a closed loop feedback and control system for feeding back a signal from a reference coil to a drive coil for controlling the signal driving the drive coil and thus its radiated magnetic field.

Another further object of the instant invention is to provide a signal conditioning and control system as characterized above which includes a closed loop feedback and control system comprised of a drive coil carrying an alternating current for emanating a first magnetic field for inducing eddy currents in a target object and a feed back loop for controlling the first magnetic field, the system further includes a sense coil interposed between the target object and drive coil for sensing, during the control of the first magnetic field, an induced alternating current correlative to the gap between the probe and target object.

Another further object of the instant invention is to provide the multi-coil eddy current proximity probe system as characterized above which eliminates temperature errors, and manufacturing and component variations as a consequence of the instant invention including them in a closed loop feedback and control system which extends all the way out to a tip of the probe.

Another further object of the instant invention is to provide the multi-coil eddy current proximity probe system as characterized above which senses current that fluctuates in value as the target object to probe distant fluctuates.

Another further object of the instant invention is to provide the multi-coil eddy current proximity probe system as characterized above which opposes changes of an output of a radiated magnetic field from a drive coil (an output increase or an out put decrease) while measuring a current in a sense coil correlative a target object and sense coil proximity.

Another further object of the instant invention is to provide the multi-coil eddy current proximity probe system as characterized above which positions the reference coil to be inductively coupled to the drive coil and substantially uninfluenced by the eddy current induced magnetic field.

Viewed from a first vantage point, it is an object of the instant invention to provide a multi-coil eddy current proximity probe system, comprising in combination: a drive coil located proximate a conductive target object and radiating a first magnetic field by carrying an alternating current for inducing eddy current within said conductive target object and causing a second magnetic field to be radiated from said conductive target object; a control means operatively coupled to said drive coil for controlling said alternating current carried by said drive coil as a function of its own radiated said first magnetic field; a sense coil interposed between said drive coil and said conductive target object for sensing, during the control of said first magnetic field radiating from said drive coil, said second magnetic field radiating from said conductive target object such that an alternating current correlative to a position between said sense coil and said conductive target object is induced within said sense coil, and a processor operatively coupled to said sense coil for processing said induced alternating current in said sense coil and transforming said induced alternating current into output signals correlative to said position between said sense coil and said conductive target object.

Viewed from a second vantage point, it is an object of the instant invention to provide a multi-coil eddy current proximity probe system, comprising in combination: three coaxially disposed coils including a sense coil, a drive coil and a reference coil; said drive coil interposed between said sense coil and said reference coil and operatively coupled to and coating with a controllable current source for carrying a controlled alternating current delivered from said controllable current source and for radiating a first magnetic field from said drive coil to an adjacent conductive target object for generating eddy currents within said conductive target object resulting in a second magnetic field radiating from said conductive target object; said reference coil inductively coupled to said drive coil by said first magnetic field such that a first current indicative of said first magnetic field is induced within said reference coil; control means including a feedback loop means comprised of said reference coil and said controllable current source for processing said induced first current indicative of said first magnetic field and controlling said controllable current source as a function of said induced first current indicative of said first magnetic field for delivering said controlled alternating current to said drive coil such that said controlled alternating current delivered to said drive coil controls said first magnetic field radiated from said drive coil; said sense coil inductively coupled to said adjacent target object for sensing said second magnetic field radiating from said conductive target object such that a second current correlative to a position between said sense coil and said conductive target object is induced within said sense coil during said control by said control means of said first magnetic field radiating from said drive coil, and a processor operatively coupled to said sense coil for processing said induced second current in said sense coil and transforming said induced second current into output signals correlative to said position between said sense coil and said conductive target object.

Viewed from a third vantage point, it is an object of the instant invention to provide a multi-coil eddy current proximity probe system, comprising in combination: a first coil; a signal generator operatively coupled to said first coil; said first coil emanating a first magnetic field by carrying a first alternating current delivered from said signal generator to said first coil, said first magnetic field inducing eddy currents within an adjacent conductive target object causing a second magnetic field to emanate back toward said first coil; a second coil inductively coupled to the adjacent conductive target object and interposed between said first coil and the adjacent conductive target object; said second coil carrying a second alternating current induced by said second magnetic field and correlative to a position of the adjacent conductive target object; a third coil located adjacent said first coil and carrying a third alternating current induced by said first magnetic field emanating from said first coil; means for controlling said first alternating current carried in said first coil as a function of the said third alternating current induced by said first magnetic field radiating from said first coil for substantially holding said first alternating current carried in said first coil substantially constant, and means for receiving said second alternating current and transforming said received second alternating current into output signals correlative to the position of the adjacent conductive target object while holding said first alternating current carried in said first coil substantially constant for monitoring the position of the conductive target object.

Viewed from a fourth vantage point, it is an object of the instant invention to provide a method for determining a position of a conductive target object of a machine for monitoring the machine for indications of incipient problems, the steps including: locating a drive coil proximate the conductive target object; interposing a sensing coil between the drive coil and the conductive target object; driving the drive coil with an alternating signal for generating eddy currents in the conductive target object; detecting a signal in the sensing coil induced by a magnetic field radiating from the conductive target object produced from the eddy currents in the target object, and transforming said signal into a output signal correlative to the position of the conductive target object, and determining if said output signal is an indication of an incipient machine problem.

These and other objects will be made manifest when considering the following detailed specification when taken in conjunction with the appended drawing figures.

BRIEF DESCRIPTION OF THE DRAWINGS

FIG. 4 is a schematic of another preferred form of the instant invention showing detail of a feedback and control loop in accordance with the instant invention.

DESCRIPTION OF PREFERRED EMBODIMENTS

Considering the drawings, wherein like reference numerals denote like parts throughout the various drawing figures, reference numeral 10 is directed to the multi-coil eddy current proximity probe system according to the present invention.

Figure 1:
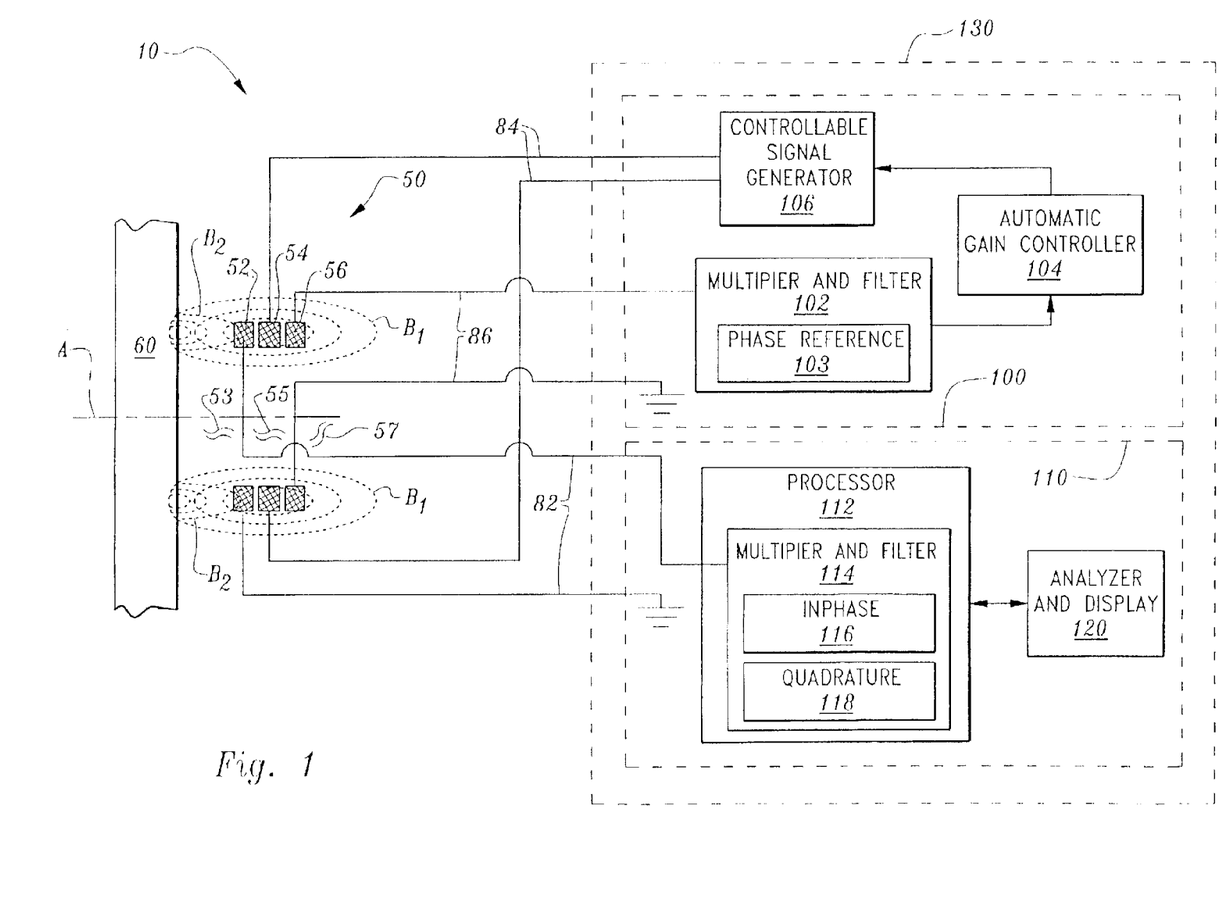
FIG. 1 is a general schematic of a multi-coil eddy current proximity probe system for determining displacement motion and position of an observed conductive target object and in accordance with the instant invention.

In its essence, and referring to FIG. 1, the multi-coil eddy current proximity probe system 10 includes a multi-coil array 50 comprised of a drive coil 54 engendering eddy currents in an adjacent conductive target object 60, a sense coil 52 interposed between the drive coil 54 and the target object 60 for sensing current induced in the sense coil 52 by the eddy currents engendered in the target object 60, and a reference coil 56 situated behind the drive coil 54 and carrying a drive coil induced alternating current or reference current. Additionally, the system 10 includes a signal conditioning and control system 130 comprising a feedback and control loop 100 operatively coupling the reference coil 56 to the drive coil 54 for controlling the alternating current carried by the drive coil 54 and thus, controlling the eddy currents engendered in the target object 60 by the drive coil 54. Furthermore, the signal conditioning and control system 130 includes a processor/analyzer system 110 operatively coupled to said sensing coil 52 for processing the sensed current induced by the eddy currents engendered in the target object 60 (the induced current changing as a function of the gap between the multi-coil array 50 and the target object 60), and transforming the sensed current into output signals correlative to a gap between the multi-coil array 50 and the target object 60.

Figure 6:
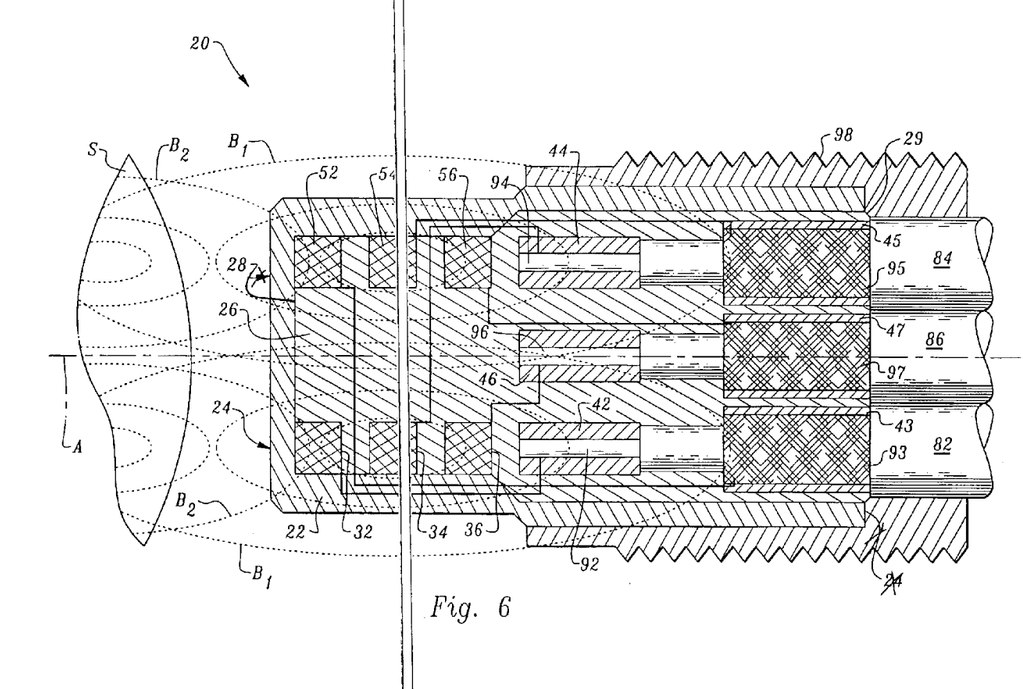
FIG. 6 is a sectional view taken along line 6—6 of FIG. 5 with portions of the shaft and the probe cut away to reveal interior details thereof.

More specifically, and referring to FIGS. 1 and 6, the system 10 is comprised a proximity probe 20 having the multi-coil array 50 comprised of the sense coil 52, the drive coil 54, and the reference coil 56 situated in an adjacent coaxial relationship with their respective hollow interiors or air cores 53, 55, 57 substantially coaxially arranged along a common longitudinal axis "A". The drive coil 54 is interposed between the sense coil 52 and the reference coil 56 such that the sense coil 52 is positioned at a forward most end 22 of the probe 20.

The system 10 further includes the feedback and control loop 100 comprised of a first multiplier 102 having an input operatively coupled to the reference coil 56 via a multi-conductor cable 86 and having an output electrically connected to an input of the automatic gain controller 104 (e.g., a controllable current or voltage source). In turn, an output of the automatic gain controller 104 is electrically connected to an input of the controllable signal generator 106 that in turn has an output coupled to drive coil 54 via a multi-conductor cable 84 for driving the drive coil 54 such that it carries an alternating current.

The alternating current carried by the drive coil creates a varying magnetic field $B_1$. This varying magnetic field produces eddy currents in the target object 60 that cause a second or target varying magnetic field $B_2$ to be produced which radiates from the target 60 back toward the drive coil 54. The sense coil 52 is interposed between the drive coil 54 and the target object 60 and when the target varying magnetic field interacts with the sense coil 52 it induces an alternating current (a target induced current) in the sense coil 52. The target induced alternating current in the sense coil 52 includes an amplitude and a phase that is different and unique for different target object materials 60 and for different distances between the multi-coil array 50 and the target objects 60.

Any variation in the magnetic field $B_1$ radiated by the drive coil 54 is reflected in the alternating current induced in the reference coil 56 which is detected by the multiplier 102 that outputs a control signal correlative to the detected phase of the alternating current induced in the reference coil 56. The control signal of the multiplier is fed back to the signal generator 106 via the automatic gain control circuit 104 that utilizes the control signal to provide a corrective second control signal that automatically adjusts the gain of the signal generator 106 for controlling the drive signal driving the drive coil 54. Thus, any attenuation by the cable 86 coupling the reference coil 56 to the first multiplier 102 is corrected for by the closed feedback loop between the drive coil 54 and the reference coil 56. Furthermore, temperature variations, manufacturing variations and component variations are inside a closed feedback loop and are thus compensated.

Figure 2:
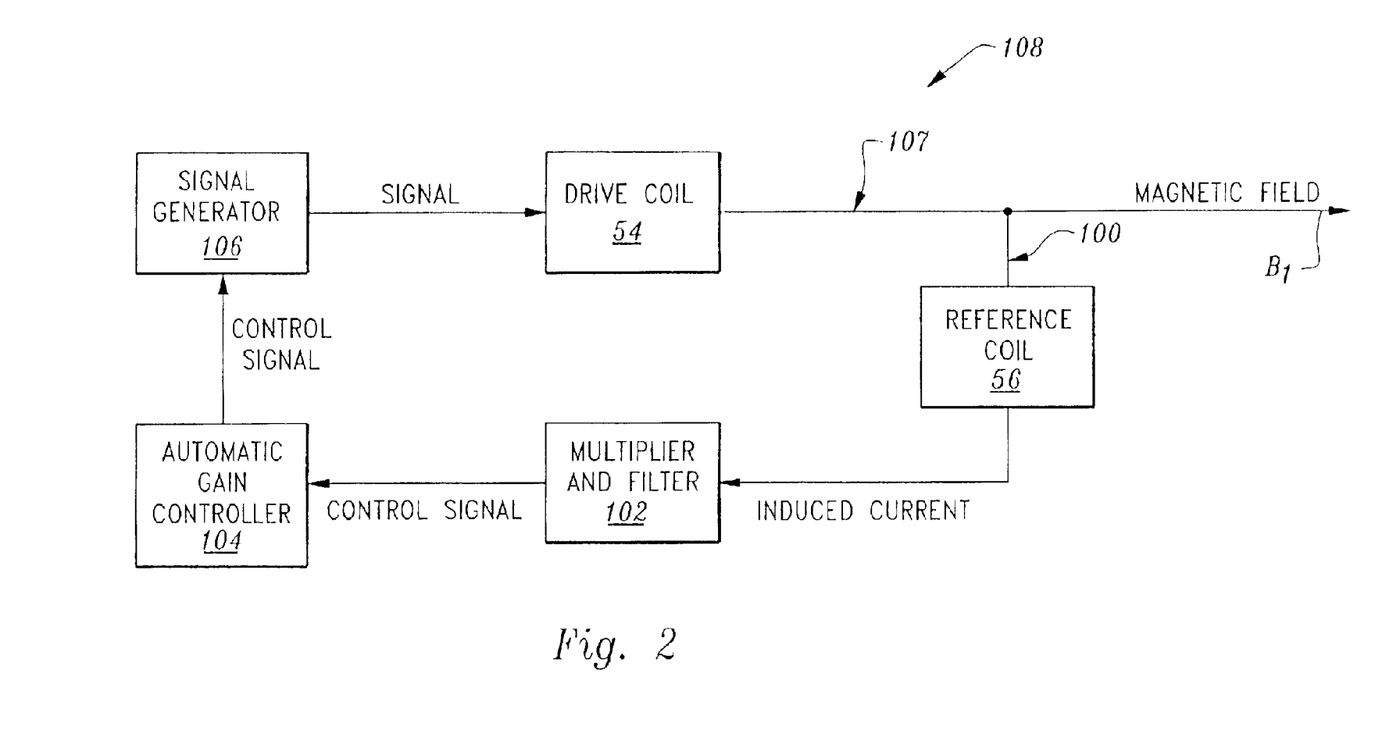
FIG. 2 is a closed loop feedback and control system block diagram in accordance with the instant invention.

Referring to FIG. 2, the feedback and control loop 100 is part of a closed loop feedback and control system 108 comprised of a feed forward path 107 and a feed back path defined by the feedback and control loop 100. The operational flow of the closed loop feedback and control system 108 can be traced from the signal generator 106 driving the drive coil 54 disposed in the feed forward path 107. In turn, the drive coil 54 radiates a closed loop output signal in the form of the magnetic field $B_1$ that induces alternating current into the reference coil 56 disposed in the feed back path 100. The multiplier 102 and the automatic gain controller 104 close the feedback loop 100. Thus, the reference coil 56 feeds the induced current to the multiplier 102 that outputs the control signal that is received by the automatic gain controller 104 which utilizes the control signal to provide the corrective control signal that automatically adjusts the gain of the signal generator 106 for providing the closed loop control of the drive signal driving the drive coil 54 and thus closed loop control of the magnetic filed $B_1$. Hence, temperature variations, manufacturing variations and component variations in the closed loop feedback and control system 108 are compensated for such that any variations tending to change the output (magnetic filed $B_1$) of closed loop 108 are compensated for by the feed back and control loop 100 sensing these changes and providing a corrective control signal for driving the coil 54 such that the changes are opposed. Thus, It is important to note that the second magnetic field $B_2$ created by the first magnetic field $B_1$ is substantially a function of spacing as a result of the instant invention holding the first magnetic field substantially constant while the signal driving the drive coil 54 may be fluctuating as a result of temperature, component and manufacturing variations.

For Example, assume the temperature changes in the cable and the loss in all cables goes up. The signal detected by the reference coil will go down, forcing the drive coil to be driven to harder to compensate. The signal from the sense coil will also have gone down, but once the feedback pushed it back up, its level should rise to the same level.

Alternatively, if the cable were longer and drove the signal strength down (I'll talk about resonance frequency effects later), this mechanism would compensate for that. Say adding 1 meter of cable dropped the signal, by ½, in both the reference and sense cables. The drive coil level would be increased until the same signal was detected again.

Referring back to FIG. 1, the system 10 further includes the processor/analyzer system 110 or signal conditioning electronics comprised of a processor 112 including a second multiplier 114 operatively coupled to the sensing coil 52 via a multi-conductor cable 82 for processing the sensed current induced by the eddy currents engendered in the target object 60 (the induced current changing as a function of the gap between the multi-coil array 50 and the target object 60), and transforming the sensed current into output signals correlative to a gap between the multi-coil array 50 and the target object 60. The multi-conductor cable 82 is preferably of the same length as the cable 86 coupling the reference coil 56 to the first multiplier 102.

Thus, the system 100 receives a signal that is transmitted down the cable 86 from the reference coil 56. This signal is processed and feedback by the feedback loop 100 to the signal generator 106 for controlling the output signal of the signal generator 106 to the drive coil 54. Thus, any alterations of the amplitude and/or phase in the reference signal are corrected for and the drive coil 54 is driven such that it emanates a substantially constant magnetic field $B_1$. The sense coil 52 sees this magnetic field and also sees the magnetic field $B_2$ emanated back from the target object 60. Thus, by holding the drive coil field $B_1$ constant over varying component and environmental conditions the changes in the sense coil signal are proportional to the position of the target object relative to the coil array 50 and are processed by the signal conditioning electronics 110 to output a signal proportional to the distance or gap between the coil array 50 and the proximate conductive target object 60.

If you assume that the mutual inductance of the reference coil to drive coil matches the sense coil to drive coil then this arrangement will also compensate the sense coil. If you assume that the transfer function of the cable from the reference coil matches the transfer function of the sense coil, then this is also compensated.

The system 110 further includes an analyzer/display 120 (e.g., a computer) that is electrically connected to the processor for receiving inphase and quadrature signals for further reduction and display.

Thus, the second multiplier 114 transforms the target induced current in the sense coil into an inphase component 116 and quadrature component 118 which are in turn, further processed by processor 112 and/or supplied to the analyzer/display device 120 for correlating the inphase and quadrature components to gap values and to a specific type of target material being monitored. Thus, the system 10 measures the values of the current fluctuations in the sense coil as a function of the distance fluctuations between the target 60 and the multi-coil array 50. Furthermore, any conductive target material can be used without having to manually recalibrate the system.

More specifically, the detection of the inphase and quadrature signals from the sense coil will be different and unique for each target and gap. Hence, a family of curves can be drawn that have the same gap value for different target materials. For example, by knowing the voltage across and the current through the sense coil and by knowing the far gap impedance of the sense coil one can determine normalized impedance curves for different target materials which can be used to discern a family of curves that have the same gap value for different target materials.

Moreover, the magnetic field from the drive coil 54 also induces a varying current in the sense coil 52 which can be subtracted out by, for example, the processor/analyzer system 110. Alternatively, the system 10 can hold the current carried in the drive coil 54 constant such that the current induced in the sense coil 52 by the driving coil 54 is a known value which can be easily compensated for by the processor/analyzer system 110 to obtain a current which is a function of the current induced in the sense coil 52 by the flow of eddy currents in the target object 60.

The instant invention can be further elucidated by looking at the interaction between a single coil and its impedance change in a more exact way by saying the following: AC current flow in the single coil causes an AC magnetic field to form; When the AC magnetic field intersects a metallic target object, AC current is induced in the target (eddy currents); AC current (eddy currents) in the target causes a second AC magnetic field to form; When the target AC magnetic field intersects with the single coil, it induces AC current flow in the single coil and the impedance of the single coil changes.

As an example of this, assume you have the signal coil with 10 ohms resistance, and 40 $\mu$H inductance running at 1 MHz. The impedance of the coil is: $10+j*2*pi*40e-6*1e6= 10+j251.3\Omega$. If you have a 1 Vpp sine wave driving the coil, the current flow is: $0.58-j3.973$ mA. If the impedance changes to: $11+j180$ when the target is brought near the current is: $0.338-j5.535$ mA. This is typical for high conductivity targets like aluminum or copper.

Since superposition applies, the current induced by the target is: $(0.338-j5.535)-(0.158-j3.973)=0.180-j1.562$ The ratio of current induced by the target to current induced by the 1Vpp driving signal is $(0.180-j1.562/(0.158-j3.973)-0.394+j0.0296=0.395$ at an angle of 74.98 degrees. So, for every amp of current flowing in the single coil due to the driving voltage, 0.395 amps will be induced back from the target.

Hence, the instant invention recognized that since there is different and unique impedance for the signal coil for each gap and target material there must be a different and unique transfer function of current for each gap and target material. This means that the magnetic field from the target has a different and unique value for these conditions.

Thus, instead of measuring the impedance of the driving coil to see this effect, the instant invention adds a second coil, sense coil 52, and looks at the current induced in by a driving coil 54 and by a target 60 for obtaining the exact same information. Additionally, the system 10 can subtract out the current induced in the sense coil 52 by the driving coil 54, or hold the driving coil current constant so that it doesn't provide a false signal.

Figure 3:
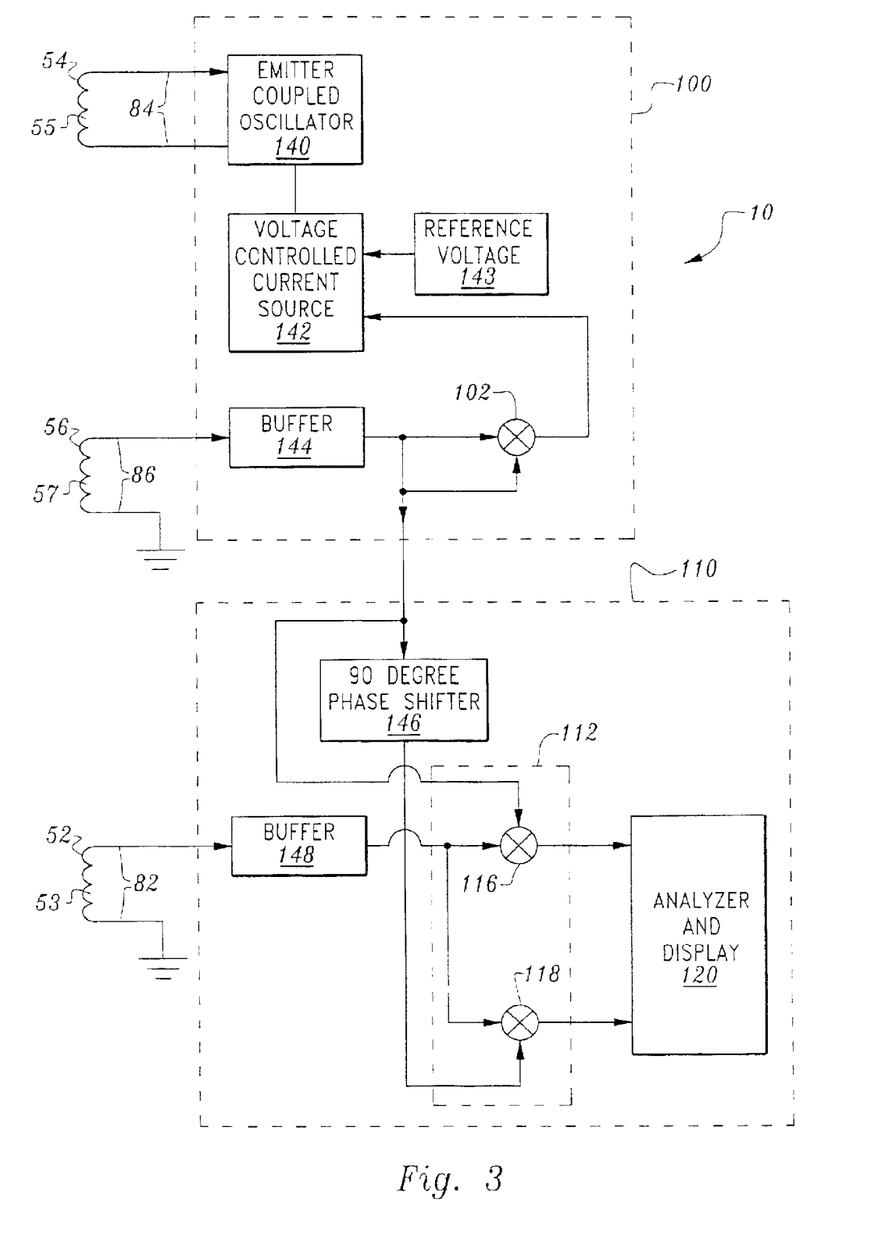
FIG. 3 is a schematic of one preferred form of the instant invention showing detail of a feedback and control loop in accordance with the instant invention.

Referring now to FIG. 3, and in one preferred form, the controllable signal generator is an emitter coupled oscillator 140 and the feedback and control loop 100 is comprised of the first multiplier 102 electrically connected to a voltage controlled current source 142 for providing means for controlling the emitter coupled oscillator 140 to sustain an oscillation at a fixed frequency and amplitude.

The emitter-coupled oscillator 140 is a transistor based radio frequency oscillator that utilizes one or more transistors in conjunction with an inductor/capacitor (LC) tank circuit that includes the drive coil 54 as an inductive element. The output of the emitter coupled oscillator 140 is controlled by the voltage controlled current source 142 which receives a control signal from the multiplier 102 that causes the current source 142 to output a signal to the emitter coupled oscillator 140 which drives the drive coil 54 such that the reference signal is brought back into conformance with a desired reference signal that would be sensed by the multiplier 102 when the magnetic field $B_1$ is maintained at a desired strength. Buffer 144 may used to filter any harmonics.

More particularly, the reference coil 56 picks up an AC signal that is coupled in from the drive coil 54 such that there is a reference or sine signal from reference coil 56 sitting at the input to multiplier 102. This signal from the reference coil is put into both inputs of the multiplier 102 by itself. This signal is then low passed filtered which essentially gives an RMS measurement or in other words, is a way of getting the magnitude of the output signal from the reference coil.

The technique is also used for obtaining the inphase and quadrature signals output from multipliers 116, 118 as delineated hereinbelow. For example, the reference signal output from the reference coil 56 is multiplied by a signal output by the sense coil 52.

The magnitude of the output from the reference coil is sent to the voltage controlled current source 142 and that magnitude is compared to a reference, a voltage value, provided by reference voltage 142 for determining if the magnitude of the output is more or less than the reference value. The output of this comparison dictates weather the gain of the emitter coupled oscillator is increased or decreased by increasing or decreasing the amount of current going into the oscillator 140 so that the oscillator is always driving to have the same voltage seen on the reference coil 56 and so that oscillation of the oscillator 140 is maintained at a substantially constant level.

For example, the reference may be a two volt voltage and the output of the multiplier, a multiplier voltage, may also be two volts. Thus, everything is exactly right. But if things start to drift high or low the feedback loop drives it back to the two volt reference.

On turn on, the current going into the oscillator 140 is fairly low plus the oscillator is just starting to switch the way it is supposed to. So what happens is that there will be very little signal coupling from the drive coil 54 to the reference coil 56. Thus, the voltage as seen after the buffer and multiplier is significantly lower then what the reference voltage is and as a result, the current in the oscillator increases rapidly. Eventually, there will be a point in which the oscillator is running such that the current going into the oscillator results in an oscillation that causes the multiplier to come close to the voltage of the reference thereby stabilizing the oscillator output.

Furthermore, FIG. 3 shows the processor/analyzer 110 as being comprised of a ninety-degree phase shifter 146 that includes an input that receives the reference signal from the reference coil and phase shifts it by ninety degrees. This ninety degree shifted signal along with the original sense signal is processed by phase detector or second multiplier 118 to obtain a detected sense quadrature signal from the sense coil. The original reference signal and the sense signal are processed by the phase detector or third multiplier 116 to obtain a detected inphase signal from the sense coil. A quadratic equation can be used to convert the Inphase and Quadrature signals from the sense coil into a truly linear output that provides unique values depending upon the target material used.

Since the reference signal from the reference coil 56 is in the closed loop, the reference signal coming down to the block 110 is at a constant magnitude because it is inside the feedback loop. It is also at a constant phase shift because it is its own reference 103. In other words, it is the definition of what the phase angle is. This is important because you are assuming that any phase lag between the drive coil and the reference are the same as from the drive coil to the sense coil. So if the cable lengths are changed it does not impact the phase reference 103 (see FIG. 1).

The reference is run into multiplier 116 such that the sense coil is picking up the signal from both the drive coil and the target. Multiplier 116 multiplies the reference signal by the sense coil signal output from the sense coil 52 and which may be buffered by buffer 148.

The reference signal can be defined as having a phase of zero degrees which is defined by a cosine function such that cosine $\omega$ defines the reference signal wherein $\omega$ is the frequency of the reference signal.

Thus, the sense coil signal has been multiplied by cosine $\omega$ thereby defining an inphase signal which is low passed filtered. This gives the inphase component of the signal coming out of the sense coil.

A quadrature signal is obtained by phase shifting the reference signal by ninety degrees and multiplying this signal by the sense coil signal for defining a quadrature signal or component which is low passed filtered.

Thus, these inphase and quadrature components can be used to define the vector magnitude and phase of what the sense coil sees and pickups.

The system 10 can work with different materials, by measuring the complex value of the current induced in the sense coil 52 by using the Inphase (I) and Quadrature (Q) detection described above which employs using the signal from the reference coil 56 for the Inphase multiplication signal and a 90° shifted version of the reference signal for the Quadrature multiplication signal. The cable will induce a phase shift as well as an amplitude shift in the received signals, so this is necessary to maintain phase accuracy.

Additionally, the instant invention includes a material insensitive method comprised of the steps of: determining a plurality of normalized impedance curves for different materials and preferably storing the curves in a memory means; defining a series of locus lines on the impedance curves that represent the same gap for the different materials; measuring an impedance of the sense coil located proximate a target material to be monitored by obtaining the inphase and quadrature components as delineated above, normalizing the measured sense coil impedance and comparing the normalized sense coil impedance with the series of locus stored in the memory means for determining a gap locus that corresponds to the normalized impedance value of the sense coil wherein the corresponding gap locus reveals a gap value substantially correct for any target material being monitored thereby providing a material insensitive system 10.

In another form, the material insensitive method of the instant invention includes the steps of: determining a plurality of normalized impedance curves for different materials and defining a series of locus lines on the impedance curves that represent the same gap for the different materials; storing an equation(s) or numerical methods which approximate the locus lines in the memory means; measuring an impedance of the sense coil located proximate a target material to be monitored, normalizing the measured sense coil impedance and using the equations(s) or numerical methods for determining a gap locus that corresponds to the normalized impedance value of the sense coil wherein the corresponding gap locus reveals a gap value substantially correct for any target material being monitored thereby providing a material insensitive system 10.

Referring now to FIG. 4, and in another preferred form, a phase locked loop circuit 160 is employed for the feedback 100. The phase locked loop circuit 160 is comprised of a phase detector or multiplier 162 having an input that receives a reference signal from the reference coil 56. Another input of the phase detector 162 receives an input from an output of a voltage-controlled oscillator 166. An output of the phase detector 162 is connected to an input of the voltage-controlled oscillator 166. The phase detector 162 compares the phases/amplitudes of the two signals and, if the two signals are out of phase and/or different in amplitude, produces a positive or negative output according to the direction of phase error and/or amplitude difference. This output is fed to the voltage-controlled oscillator 166, which changes frequency/amplitude in such a way as to move its output signal back into phase/amplitude with the incoming signal.

Thus, the voltage-controlled oscillator 166 tracks the changes of the reference signal by continuously altering its own signal to correspond with the incoming reference signal from the reference coil thereby maintaining a substantially constant frequency and/or amplitude relationship between an oscillator output to the drive coil 54 and the detected input signal from the reference coil 56.

A loop filter 164 may be interposed between the phase detector 162 and the voltage controlled oscillator 166 for outputting a filtered output voltage, amplified if necessary.

Figure 5:
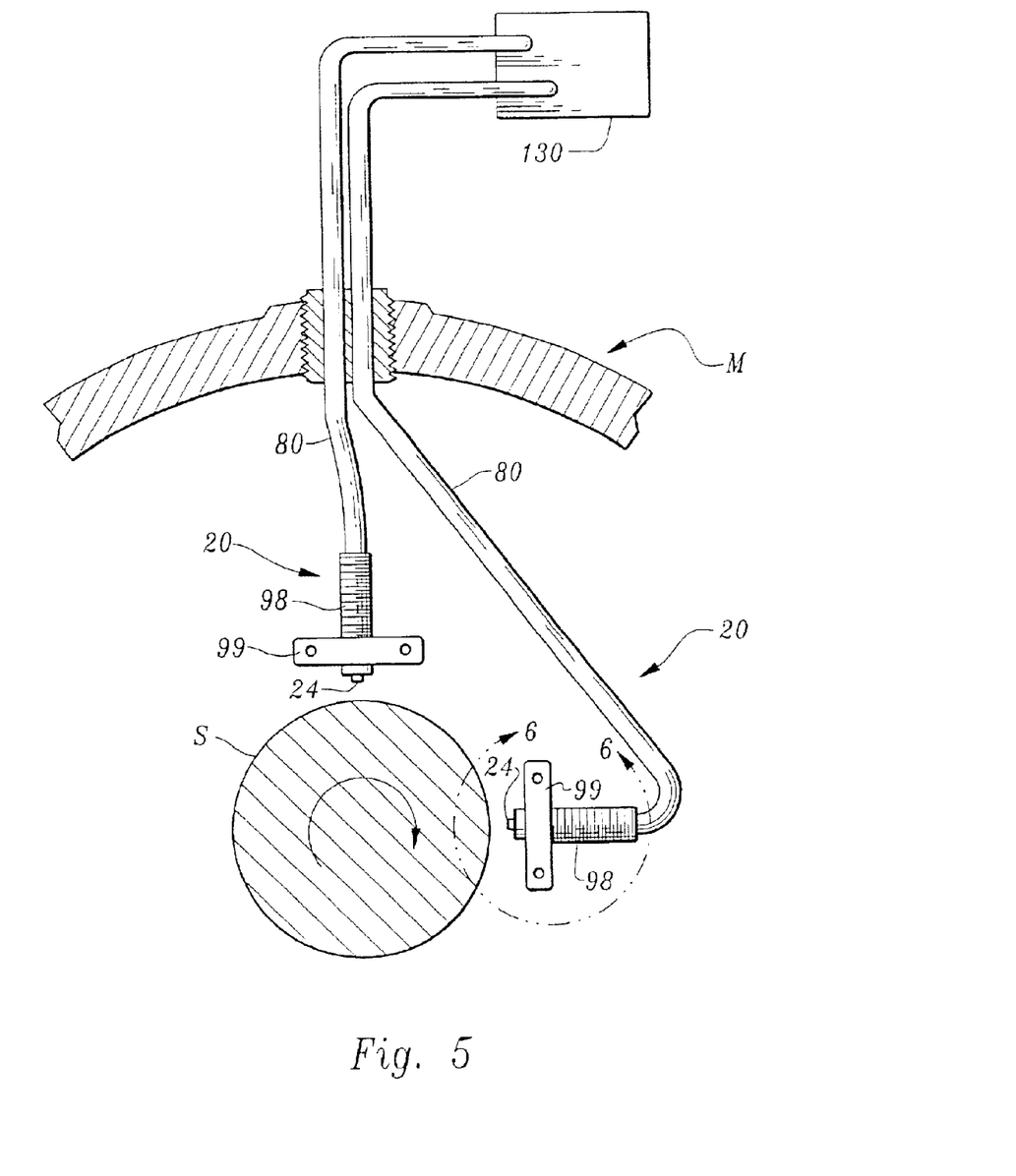
FIG. 5 is an elevational view of the proximity probe pursuant to the present invention and shown in a representative application of monitoring a rotating shaft of a machine for monitoring machine vibration.

In use and operation, and referring to a representative application illustrated in FIG. 5, the proximity probe system 10 is shown comprised of an XY pair of proximity probes utilized for monitoring the vibrational characteristics of a rotating shaft S of a machine M. In this environment the proximity probes 20 operate on the eddy current principle and output signals correlative to the spacing between the rotating shaft S and the proximity probes 20.

Referring to FIGS. 5 and 6, each proximity probe 20 is comprised of an encapsulated proximity probe tip 24 circumscribed by a metal case 98 strategically mounted by a mounting means 99 such that the coil array 50 and the rotating shaft S are in a juxtaposed relation. The coil array 50 is supported at a forward end 28 of a preform 26 and is electrically and mechanically connected to a cable cluster 80 comprised of cables 82, 84, 86. Each coil 52, 54, 56 includes a first and a second lead respectively extending away from coil back ends 32, 34, 36 and respectively connected to a respective center conductor 92, 94, 96 and a respective braided conductor 93, 95, 97 of each respective cable 82, 84, 86 via respective metal ferrule pairs 42, 43; 44, 45; 46, 47 and soldering. Each respective cable cluster 80 extends out the back end 29 of the encapsulated proximity probe tip 24 and runs through a casing of the machine M where each cable preferably terminates to a connection capable of coupling to the signal conditioning and control system 130. The output signals of the probes are received by the signal conditioning and control system 130 that includes the processor 112 for transforming signals and the analyzer 120 (e.g., a computer) for data reduction and display.

Preferably, the cables are coupled to the signal conditioning and control system 130 via a set of substantially matched cable lengths. Thus, changes in the resistance and impedance of any one of the one coil and cable assembly due to temperature is seen by the three coil and cable assemblies substantially sharing the same resistance and impedance alterations due to varying environmental and component conditions. Thus, sensing these changes in one coil and cable assembly allows the compensation of these effects in for another coil and cable assembly.

Moreover, when the alternating drive coil 54 is driven with an alternating signal it generates a magnetic field $B_1$ that induces eddy currents in the proximate conductive target object. The eddy currents generate the magnetic field $B_2$ that is sensed by the sense coil 52 that results in a signal traveling down the cable to the signal conditioning electronics 110. When this signal goes through the cable 82 it is attenuated and shifted in time such that there is a gain factor and a phase shift.

The coils 52, 54 56 are all in a single probe and are preferably coupled to substantially equal cable lengths leading back to the signal conditioning and control system 130. Therefore, the attenuation and the phase shift due to temperature and resistance changes in the coils and cables are substantially equal. Thus, system 130 sees the same attenuation and phase shift (due to the cable) from both the reference coil 56 and the sense coil 52 thereby being able to provide a corrective signal to the signal generator or oscillator which corrects for the attenuation and phase shift, holds the sense signal constant, only effected by the target.

The attenuation factor and the phase shift from the sense coil 52 and the reference coil 56 are substantially the same. Therefore, the system 130 detects the amplitude and the phase angle of the signal transmitted from the reference coil 56 and provides a control signal which controls the amplitude and the phase of the signal driving the drive coil 54 thereby controlling the drive signal transmitted from the sense coil 52.

Thus, there is an attenuation factor from the sense coil 52 and a matching and substantially equal attenuation factor at the reference coil 56 and the loop is closed on the signal generator 106 to maintain the same magnitude of voltage from the reference coil 56 as from the sense coil.

Additionally, the system 110 can provide corrected error phase by using the phase shift reference signal 103 that drives inphase and quadrature components 116, 118.

Alternatively, if the output of the reference coil is supposed to be some predetermined signal and instead outputs a different signal one can divide the predetermined signal by the measured signal to obtain an attenuation factor comprised of amplitude and phase. This attenuation factor can then be divided into the signal outputted by the sense coil to obtain a compensated sense signal that substantially eliminates cable length variations, resistance changes in the cables and resistance changes in the coils. Any temperature changes in the drive coil or cable or the actual drive circuitry are also controlled by the feedback loop to maintain a constant output.

Moreover, having thus described the invention, it should be apparent that numerous structural modifications and adaptations may be resorted to without departing from the scope and fair meaning of the instant invention as set forth hereinabove and as described hereinbelow by the claims.

I claim:

1. A multi-coil eddy current proximity probe system, comprising in combination:
   a drive coil located proximate a conductive target object and radiating a first magnetic field by carrying an alternating current for inducing eddy current within said conductive target object for causing a second magnetic field to be radiated from said conductive target object;
   a control means operatively coupled to said drive coil, said control means comprising a reference coil disposed at least partially within said first magnetic field radiated by said drive coil such that said first magnetic field induces an alternating current in said reference coil defining an alternating reference signal, and a multiplier operatively coupled to said reference coil for receiving said alternating reference signal, multiplying said reference signal by itself, and outputting a control signal resulting from said multiplication for controlling said alternating current carried by said drive coil as a function of its own radiated said first magnetic field and such that said first magnetic field radiated from said drive coil is held substantially constant;
   a sense coil interposed between said drive coil and said conductive target object for sensing, while holding said first magnetic field radiating from said drive coil substantially constant, said second magnetic field radiating from said conductive target object such that a sensed signal correlative to a position between said sense coil and said conductive target object is induced within said sense coil, and
   a processor operatively coupled to said sense coil for processing said sensed signal induced in said sense coil and transforming said sensed signal into output signals correlative to said position between said sense coil and said conductive target object.

2. The multi-coil eddy current proximity probe system of claim 1 wherein said control means further includes a controllable signal generator operatively coupled to said drive coil and an automatic gain controller operatively coupled between said controllable signal generator and said multiplier for receiving said control signal outputted by said multiplier, processing said signal, and outputting said processed signal to said adjustable signal generator for automatically adjusting a gain of said signal generator for controlling said alternating current carried by said drive coil as a function of its own radiated said first magnetic field and such that said first magnetic field radiated from said drive coil is held substantially constant.

3. The multi-coil eddy current proximity probe system of claim 1 wherein said processor is comprised of:
   means for multiplying said alternating reference signal by said sensed signal for transforming said sensed signal into an inphase component;
   means for shifting said alternating reference signal by ninety degrees for defining a ninety degree shifted signal;
   means for multiplying said ninety degree shifted signal by said sensed signal for transforming said sensed signal coil into a quadrature component, and
   means for processing said inphase and quadrature components into gap values correlative to said position between said sense coil and said conductive target object.

4. A multi-coil eddy current proximity probe system, comprising in combination:
   a sense coil, a drive coil and a reference coil;
   said drive coil interposed between said sense coil and said reference coil and operatively coupled to and coacting with a controllable current source for carrying a controlled alternating current delivered from said controllable current source and for radiating a first magnetic field from said drive coil to an adjacent conductive target object for generating eddy currents within said conductive target object resulting in a second magnetic field radiating from said adjacent conductive target object;

said reference coil inductively coupled to said drive coil by said first magnetic field such that a first current indicative of said first magnetic field is induced within said reference coil;

control means including a feedback loop means comprised of said reference coil and said controllable current source for processing said induced first current indicative of said first magnetic field and controlling said controllable current source as a function of said induced first current indicative of said first magnetic field for delivering said controlled alternating current to said drive coil such that said controlled alternating current delivered to said drive coil holds said first magnetic field radiated from said drive coil substantially constant;

said sense coil inductively coupled to said target object for sensing said second magnetic field radiating from said conductive target object such that a second current correlative to a position between said sense coil and said conductive target object is induced within said sense coil during said control by said control means of said controlled alternating current delivered to said drive coil for holding said first magnetic field radiating from said drive coil substantially constant, and a processor operatively coupled to said sense coil for processing said induced second current in said sense coil, said processor comprised of:

means for multiplying said first current induced in said reference coil by said second current induced in said sense coil for transforming said second current induced in said sense coil into an inphase component;

means for shifting said first current induced in said reference coil by ninety degrees for defining a ninety degree shifted signal;

means for multiplying said ninety degree shifted signal by said second current induced in said sense coil for transforming said second current induced in said sense coil into a quadrature component, and means for transforming said inphase and quadrature components into output signals correlative to said position between said sense coil and said conductive target object.

5. The multi-coil eddy current proximity probe system of claim 4 wherein said means for transforming said inphase and quadrature components into output signals correlative to said position between said sense coil and said conductive target object includes means for transforming said inphase and quadrature components into gap values correlative to said position between said sense coil and said conductive target object.

6. The multi-coil eddy current proximity probe system of claim 5 wherein said means for transforming said inphase and quadrature components into output signals correlative to said position between said sense coil and said conductive target object includes means for transforming said inphase and quadrature components into gap values correlative to said position between said sense coil and said conductive target object and correlative to a material of said conductive target object.

7. A multi-coil eddy current proximity probe system, comprising in combination:

a first coil;

a signal generator operatively coupled to said first coil;

said first coil emanating a first magnetic field by carrying a first alternating current delivered from said signal generator to said first coil, said first magnetic field inducing eddy currents within an adjacent conductive target object causing a second magnetic field to emanate back toward said first coil;

a second coil inductively coupled to the adjacent conductive target object and interposed between said first coil and the adjacent conductive target object;

said second coil carrying a second alternating current induced by said second magnetic field defining a sensed signal correlative to a position of the adjacent conductive target object;

a third coil located adjacent said first coil and carrying a third alternating current induced by said first magnetic field emanating from said first coil;

means for controlling said first alternating current carried in said first coil as a function of the said third alternating current induced by said first magnetic field radiating from said first coil for substantially holding said first magnetic field emanating from said first coil substantially constant, and a processor operatively coupled to said second coil for processing said sensed signal, said processor comprised of:

means for receiving said sensed signal from said second coil and transforming said received sensed signal into inphase and quadrature components;

means for transforming said inphase and quadrature components into output signals correlative to the position of the adjacent conductive target object while holding said first magnetic field emanating from said first coil substantially constant for monitoring the position of the conductive target object.

* * * * *